(12) United States Patent
Shriber et al.

(10) Patent No.: US 11,507,630 B2
(45) Date of Patent: *Nov. 22, 2022

(54) SYSTEM AND METHOD FOR TRANSMITTING SUBMISSIONS ASSOCIATED WITH WEB CONTENT

(71) Applicant: NEWSPLUG, INC., New York, NY (US)

(72) Inventors: John S. Shriber, New York, NY (US); Roman Zaks, New York, NY (US)

(73) Assignee: NEWSPLUG, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/509,425

(22) Filed: Jul. 11, 2019

(65) Prior Publication Data
US 2019/0332589 A1   Oct. 31, 2019

Related U.S. Application Data

(63) Continuation of application No. 14/717,984, filed on May 20, 2015, now Pat. No. 10,387,391, which is a
(Continued)

(51) Int. Cl.
| | | |
|---|---|---|
| *G06F 16/00* | (2019.01) | |
| *G06F 16/951* | (2019.01) | |
| *G06Q 10/10* | (2012.01) | |
| *G06F 16/22* | (2019.01) | |
| *G06F 16/248* | (2019.01) | |
| *G06F 16/9535* | (2019.01) | |
| *G06F 16/2457* | (2019.01) | |
| *G06F 40/35* | (2020.01) | |

(Continued)

(52) U.S. Cl.
CPC .......... *G06F 16/951* (2019.01); *G06F 3/0482* (2013.01); *G06F 3/04842* (2013.01); *G06F 16/22* (2019.01); *G06F 16/248* (2019.01); *G06F 16/24578* (2019.01); *G06F 16/9535* (2019.01); *G06F 40/166* (2020.01); *G06F 40/169* (2020.01); *G06F 40/35* (2020.01); *G06Q 10/10* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | |
|---|---|---|
| 6,199,081 B1 | 3/2001 | Meyerzon et al. |
| 6,718,365 B1 | 4/2004 | Dutta |

(Continued)

OTHER PUBLICATIONS

Title: Search Engine, U.S. Appl. No. 13/420,503, filed Mar. 14, 2012, Inventor(s): John Shriber, et al, U.S. Pat. No. 9,338,215, Issue Date: May 10, 2016.

(Continued)

*Primary Examiner* — Maikhanh Nguyen
(74) *Attorney, Agent, or Firm* — Greenberg Traurig

(57) ABSTRACT

Among other things, embodiments of the present disclosure enable real-time communication between a first user and a second user regarding web content, and enable the second user to receive a submission of at least some of the web content from the first user.

20 Claims, 17 Drawing Sheets

Related U.S. Application Data continuation of application No. 13/420,508, filed on Mar. 14, 2012, now Pat. No. 9,058,391.

(60) Provisional application No. 61/452,595, filed on Mar. 14, 2011.

(51) Int. Cl.
| | |
|---|---|
| *G06F 40/166* | (2020.01) |
| *G06F 40/169* | (2020.01) |
| *G06F 3/0482* | (2013.01) |
| *G06F 3/04842* | (2022.01) |
| *H04L 67/02* | (2022.01) |
| *H04L 67/10* | (2022.01) |

(56) References Cited

U.S. PATENT DOCUMENTS

| | | | |
|---|---|---|---|
| 6,807,558 B1* | 10/2004 | Hassett | G09F 27/00 709/203 |
| 7,117,432 B1 | 10/2006 | Shanahan et al. | |
| 7,174,346 B1 | 2/2007 | Gharachorloo et al. | |
| 7,216,290 B2 | 5/2007 | Goldstein et al. | |
| 7,613,769 B1 | 11/2009 | Hess | |
| 7,617,190 B2 | 11/2009 | Wright et al. | |
| 7,634,535 B2 | 12/2009 | Watson | |
| 7,640,184 B1 | 12/2009 | Lunt | |
| 7,669,123 B2 | 2/2010 | Zuckerberg et al. | |
| 7,685,209 B1 | 3/2010 | Norton et al. | |
| 7,734,610 B2 | 6/2010 | Rakowski et al. | |
| 7,801,885 B1 | 9/2010 | Verma | |
| 7,957,723 B2 | 6/2011 | Punaganti Venkata et al. | |
| 7,958,115 B2 | 6/2011 | Kraft | |
| 7,971,147 B2 | 6/2011 | Subbarao et al. | |
| 7,984,056 B1 | 7/2011 | Kane | |
| 8,020,106 B2* | 9/2011 | Diab | G06F 16/951 715/760 |
| 3,037,093 A1 | 10/2011 | Tiu, Jr. et al. | |
| 8,082,242 B1 | 12/2011 | Mysen et al. | |
| 8,082,288 B1 | 12/2011 | Yeh et al. | |
| 8,176,055 B1 | 5/2012 | Datar et al. | |
| 8,190,997 B2* | 5/2012 | Shellen | G06F 16/958 715/733 |
| 8,276,079 B2 | 9/2012 | Davar et al. | |
| 8,290,926 B2 | 10/2012 | Ozzie et al. | |
| 8,374,975 B1 | 2/2013 | Cierniak et al. | |
| 8,386,915 B2* | 2/2013 | Howes | G06F 16/986 715/205 |
| 8,578,261 B1 | 11/2013 | Gupta et al. | |
| 8,589,391 B1 | 11/2013 | Reynar et al. | |
| 8,589,418 B1 | 11/2013 | Kane | |
| 8,601,055 B2 | 12/2013 | Smith et al. | |
| 8,606,845 B2 | 12/2013 | Dickinson et al. | |
| 8,667,385 B1 | 3/2014 | Mui et al. | |
| 8,832,083 B1 | 9/2014 | Chen et al. | |
| 8,874,541 B1 | 10/2014 | Vandehey et al. | |
| 8,874,591 B2 | 10/2014 | Dai et al. | |
| 8,996,625 B1 | 3/2015 | Singleton et al. | |
| 9,058,391 B2 | 6/2015 | Shriber et al. | |
| 9,338,215 B2 | 5/2016 | Shriber et al. | |
| 9,645,700 B2* | 5/2017 | Tsai | G06F 16/9577 |
| 9,740,794 B2 | 8/2017 | Bhumkar et al. | |
| 9,977,800 B2 | 5/2018 | Shriber et al. | |
| 10,180,952 B2 | 1/2019 | Shriber et al. | |
| 10,387,391 B2 | 8/2019 | Shriber et al. | |
| 11,106,744 B2 | 8/2021 | Shriber et al. | |
| 11,113,343 B2 | 9/2021 | Shriber et al. | |
| 2002/0046203 A1 | 4/2002 | Siegel et al. | |
| 2002/0194611 A1 | 12/2002 | Hodgkinson | |
| 2003/0233422 A1 | 12/2003 | Csaszar et al. | |
| 2004/0019611 A1 | 1/2004 | Pearse et al. | |
| 2004/0030697 A1 | 2/2004 | Cochran et al. | |
| 2004/0249800 A1 | 12/2004 | Lu | |
| 2005/0165615 A1 | 7/2005 | Minar | |
| 2005/0216457 A1 | 9/2005 | Walther et al. | |
| 2005/0257128 A1* | 11/2005 | Pasquali | G06F 16/958 715/252 |
| 2005/0267973 A1* | 12/2005 | Carlson | H04L 67/26 709/228 |
| 2005/0289468 A1 | 12/2005 | Kahn et al. | |
| 2006/0073812 A1 | 4/2006 | Punaganti Venkata et al. | |
| 2006/0095507 A1 | 5/2006 | Watson | |
| 2006/0167860 A1 | 7/2006 | Eliashberg et al. | |
| 2006/0173985 A1 | 8/2006 | Moore | |
| 2006/0184617 A1 | 8/2006 | Nicholas et al. | |
| 2006/0190616 A1 | 8/2006 | Mayerhofer et al. | |
| 2006/0217126 A1 | 9/2006 | Sohm et al. | |
| 2006/0230021 A1* | 10/2006 | Diab | G06F 16/951 |
| 2006/0230061 A1 | 10/2006 | Sample et al. | |
| 2006/0253458 A1 | 11/2006 | Dixon et al. | |
| 2007/0033517 A1* | 2/2007 | O'Shaughnessy | G06F 16/9562 715/205 |
| 2007/0043617 A1 | 2/2007 | Stein et al. | |
| 2007/0083520 A1* | 4/2007 | Shellen | G06F 16/958 |
| 2007/0083536 A1* | 4/2007 | Darnell | G06F 16/9535 |
| 2007/0118794 A1 | 5/2007 | Hollander et al. | |
| 2007/0156636 A1 | 7/2007 | Norton et al. | |
| 2007/0156809 A1 | 7/2007 | Dickinson et al. | |
| 2007/0174389 A1 | 7/2007 | Armstrong et al. | |
| 2007/0192313 A1 | 8/2007 | Finley et al. | |
| 2007/0198526 A1 | 8/2007 | Pitkow | |
| 2007/0203887 A1 | 8/2007 | Dynin | |
| 2007/0225047 A1 | 9/2007 | Bakos | |
| 2007/0266338 A1 | 11/2007 | Shirai | |
| 2007/0271246 A1 | 11/2007 | Repasi et al. | |
| 2008/0005761 A1 | 1/2008 | Repasi et al. | |
| 2008/0021880 A1 | 1/2008 | Ren et al. | |
| 2008/0028181 A1 | 1/2008 | Tong et al. | |
| 2008/0040673 A1* | 2/2008 | Zuckerberg | G06F 40/169 715/745 |
| 2008/0059444 A1 | 3/2008 | Singh et al. | |
| 2008/0059453 A1 | 3/2008 | Laderman | |
| 2008/0065649 A1 | 3/2008 | Smiler | |
| 2008/0071929 A1 | 3/2008 | Motte et al. | |
| 2008/0082904 A1 | 4/2008 | Martinez et al. | |
| 2008/0114861 A1* | 5/2008 | Gildred | H04N 21/8456 709/219 |
| 2008/0126476 A1* | 5/2008 | Nicholas | G06Q 10/10 709/203 |
| 2008/0215589 A1 | 9/2008 | Elhaik | |
| 2008/0235594 A1 | 9/2008 | Bhumkar et al. | |
| 2008/0256443 A1 | 10/2008 | Li et al. | |
| 2008/0281810 A1 | 11/2008 | Smyth et al. | |
| 2008/0294632 A1 | 11/2008 | Chang et al. | |
| 2008/0313215 A1 | 12/2008 | Beker et al. | |
| 2009/0132949 A1 | 5/2009 | Bosarge | |
| 2009/0144272 A1 | 6/2009 | Adarsh et al. | |
| 2009/0157490 A1 | 6/2009 | Lawyer | |
| 2009/0164446 A1 | 6/2009 | Holt et al. | |
| 2009/0216639 A1 | 8/2009 | Kapczynski et al. | |
| 2009/0217196 A1 | 8/2009 | Neff et al. | |
| 2009/0271388 A1 | 10/2009 | Murdock et al. | |
| 2009/0299824 A1 | 12/2009 | Barnes, Jr. | |
| 2010/0011282 A1 | 1/2010 | Dollard et al. | |
| 2010/0023506 A1 | 1/2010 | Sahni et al. | |
| 2010/0057677 A1 | 3/2010 | Rapp et al. | |
| 2010/0088170 A1 | 4/2010 | Glore, Jr. | |
| 2010/0125541 A1 | 5/2010 | Wendel et al. | |
| 2010/0199340 A1 | 8/2010 | Jonas et al. | |
| 2010/0223107 A1* | 9/2010 | Kim | G06F 16/986 709/218 |
| 2010/0257184 A1 | 10/2010 | Uy | |
| 2010/0262597 A1 | 10/2010 | Han | |
| 2010/0280860 A1 | 11/2010 | Iskold et al. | |
| 2010/0299326 A1 | 11/2010 | Germaise | |
| 2010/0306249 A1 | 12/2010 | Hill et al. | |
| 2010/0312771 A1 | 12/2010 | Richardson et al. | |
| 2010/0313252 A1 | 12/2010 | Trouw | |
| 2011/0040787 A1 | 2/2011 | Cierniak et al. | |
| 2011/0043652 A1* | 2/2011 | King | G06F 40/194 348/222.1 |
| 2011/0087649 A1 | 4/2011 | Sarukkai et al. | |
| 2011/0154212 A1 | 6/2011 | Gharpure et al. | |

(56) References Cited

U.S. PATENT DOCUMENTS

| | | |
|---|---|---|
| 2011/0161413 A1 | 6/2011 | Michael et al. |
| 2011/0179020 A1 | 7/2011 | Ozzie et al. |
| 2011/0184960 A1 | 7/2011 | Delpha et al. |
| 2011/0208822 A1 | 8/2011 | Rathod |
| 2011/0213655 A1 | 9/2011 | Henkin et al. |
| 2011/0238508 A1 | 9/2011 | Koningstein |
| 2011/0252041 A1 | 10/2011 | Broman |
| 2011/0258526 A1 | 10/2011 | Supakkul et al. |
| 2011/0320954 A1* | 12/2011 | Lawton ............... G06F 16/958 715/739 |
| 2012/0102048 A1 | 4/2012 | Heer |
| 2012/0158753 A1 | 6/2012 | He et al. |
| 2012/0159635 A1 | 6/2012 | He et al. |
| 2012/0166284 A1 | 6/2012 | Tseng |
| 2012/0166453 A1 | 6/2012 | Broder |
| 2012/0239639 A1 | 9/2012 | Shriber et al. |
| 2012/0240030 A1 | 9/2012 | Shriber et al. |
| 2012/0240053 A1 | 9/2012 | Shriber et al. |
| 2013/0066710 A1 | 3/2013 | Zimak |
| 2013/0132814 A1 | 5/2013 | Mangini et al. |
| 2015/0169749 A1 | 6/2015 | Camelo et al. |
| 2015/0256591 A1 | 9/2015 | Shriber et al. |
| 2015/0370417 A9* | 12/2015 | Tsai ................ G06Q 30/0275 705/14.71 |
| 2016/0239526 A1 | 8/2016 | Shriber et al. |
| 2018/0268006 A1 | 9/2018 | Shriber et al. |
| 2019/0146959 A1 | 5/2019 | Shriber et al. |

OTHER PUBLICATIONS

Title: Systems and Methods for Enabling a User to Operate on Displayed Web Content Via a Web Browser Plug-in, U.S. Appl. No. 13/420,507, filed Mar. 14, 2012, Inventor(s): John Shriber, et al, U.S. Pat. No. 9,977,800, Issue Date: May 22, 2018.

Title: System and Method for Transmitting a Feed Related to a First User to a Second User, U.S. Appl. No. 13/420,508, filed Mar. 14, 2012, Inventor(s): John Shriber, et al, U.S. Pat. No. 9,058,391, Issue Date: Jun. 16, 2015.

Title: System and Method for Transmitting Submissions Associated with Web Content, U.S. Appl. No. 14/717,984, filed May 20, 2015, Inventor(s): John Shriber, et al, Status: Allowed—Notice of Allowance Not Status dated Mar. 23, 2019 Yet Mailed.

Title: Search Engine, U.S. Appl. No. 15/142,479, filed Apr. 29, 2016, Inventor(s): John Shriber, et al, U.S. Pat. No. 10,18,0952, Issue Date: Jan. 15, 2019.

Title: Systems and Methods for Enabling a User to Operate on Displayed Web Content Via a Web Browser Plug-in, U.S. Appl. No. 15/984,163, filed May 18, 2018, Inventor(s): John Shriber, et al, Status: Docketed New Case—Ready for Examination, Status Date: Jun. 21, 2018.

Title: Search Engine, U.S. Appl. No. 16/247,361, filed Jan. 14, 2019, Inventor(s): John Shriber, et al, Status: Application Dispatched from Preexam, Not Yet Docketed, Status Date: Feb. 6, 2019.

* cited by examiner

Fig. 3D

Roomster — 410

Roomster - the best service since
features & largest community on Shares, Apartments & Sublets.
A
every minute!

Check out our blog!
sign up for a free account or sign in

Post your vacancies for free
Are you an apartment manager, broker, owner or sub-lessor?
Post your rentals for Free.
Add, Edit or Delete them with 24hr access
Sign up for a free account or sign in

440

SW  Roomster.com

SLANGWHO

@roomster.com — 445

Welcome to Roomster Reviews. Find reviews, comments, and updates about Roomster and Roommates. We are the world's largest online social network, the largest community http://www.roomster.com/  — 425

☐ Anonymize  👍 Like  👎 Dislike  = Neutral  ☑ Share

| # | syria |
| # | suicide |
| # | attack |
| # | kills |
| # | bombings |

Fig. 4B

Roomster

Roomster - the best service since
features & largest community on
Shares, Apartments & Sublets.
A
every minute!

Check out our blog!
sign up for a free account
or sign in

Post your vacancies for free
Are you an apartment manager, broker, owner or sub-lessor?
Post your rentals for Free.
Add, Edit or Delete them with 24hr access
Sign up for a free account or sign in BBC http://www.roomster.com/ roommate search service, ro... X

Roomster.com

SW

SLANGWHO

@roomster.com
Welcome to Roomster Reviews. Find reviews, comments, and updates about Roomster and Roommates. We are the world's largest online social network, the largest community http://www.roomster.com/ — 425

— 445 syria
suicide
attack
kills
bombings 1 comment

Wan Di
Dec 19, 12:45 AM awesome! i cannot believe it i love it sooooo much — 455

1 like  0 dislikes

Like  Dislike  = Neutral  Share

ADDED TO S
SLANGWHO SEARCH:

1 comments  1 likes  0 dislikes

[Browser window showing roommate search service at www.roomster.com]

Roomster

Roomster - the best service since
features & largest community on Shares, Apartments & Sublets. A every minute!

Check out our blog!
sign up for a free account or sign in

Post your vacancies for free
Are you an apartment manager, broker, owner or sub-lessor?
Post your rentals for Free.
Add, Edit or Delete them with 24hr access
Sign up for a free account or sign in

SLANGWHO

@roomster.com
Welcome to Roomster Reviews. Find reviews, comments, and updates about Roomster and Roommates. We are the world's largest online social network, the largest community
http://www.roomster.com/

— 425

2 comment                1 like  1 dislikes

Wan Di          awesome! i cannot
Dec 19, 12:45 AM   believe it i love it
                   sooooo much     — 455

John Shriber    this is really too bad
Dec 20, 9:34 PM                    — 465

Like  Dislike  = Neutral   Share

ADDED TO S
SLANGWHO SEARCH:
syria
suicide
attack
kills
bombings

SYSTEM AND METHOD FOR TRANSMITTING SUBMISSIONS ASSOCIATED WITH WEB CONTENT

RELATED APPLICATIONS

This application is a continuation application of U.S. patent application Ser. No. 14/717,984, filed May 20, 2015, issued as U.S. Pat. No. 10,387,391 on Aug. 20, 2019, which is a continuation application of U.S. patent application Ser. No. 13/420,508, filed Mar. 14, 2012, issued as U.S. Pat. No. 9,058,391 on Jun. 16, 2015, which claims priority to Prov. U.S. Pat. App. Ser. No. 61/452,595, filed Mar. 14, 2011, the disclosures of which applications are incorporated herein by reference in their entirety.

FIELD

The present disclosure relates to online communication between a first user and a second user, and more specifically to transmitting a feed related to the first user to the second user.

BACKGROUND

Web content accessible via the Internet includes web pages, videos, photographs, blogs, news, media, songs, etc. Communication about web content between individuals is typically done via email, blog post, or via a social networking site.

SUMMARY

There remains a need, however, to enable real-time communication between a first user and a second user about web content displayed by a web browser to enable the second user to receive at least some of the web content. Communication can include commenting on the web content, tips related to the web content, etc.

A method according to one exemplary embodiment includes receiving, by a computing device, a submission associated with web content from a first user via a first client computer; receiving, by the computing device, a request from the first user via the first client computer to provide the submission to a second user of a second client computer; and in response to the request to provide the submission to the second user, transmitting, by the computing device, a feed to the second client computer to present the submission to the second user.

The present disclosure includes various methods, apparatuses (including computer systems) that perform such methods, and computer readable media containing instructions that, when executed by computing systems, cause the computing systems to perform such methods.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views:

FIGS. 3A-3F are exemplary screen shots of a user interface and a plug-in module when a web page is added to the server computer via the plug-in module in accordance with an embodiment of the present disclosure;

FIGS. 4A-4F are exemplary screen shots of the user interface and the plug-in module when a web site is added to the server computer via the plug-in module in accordance with an embodiment of the present disclosure.

DESCRIPTION OF EMBODIMENTS

Figure 1A:
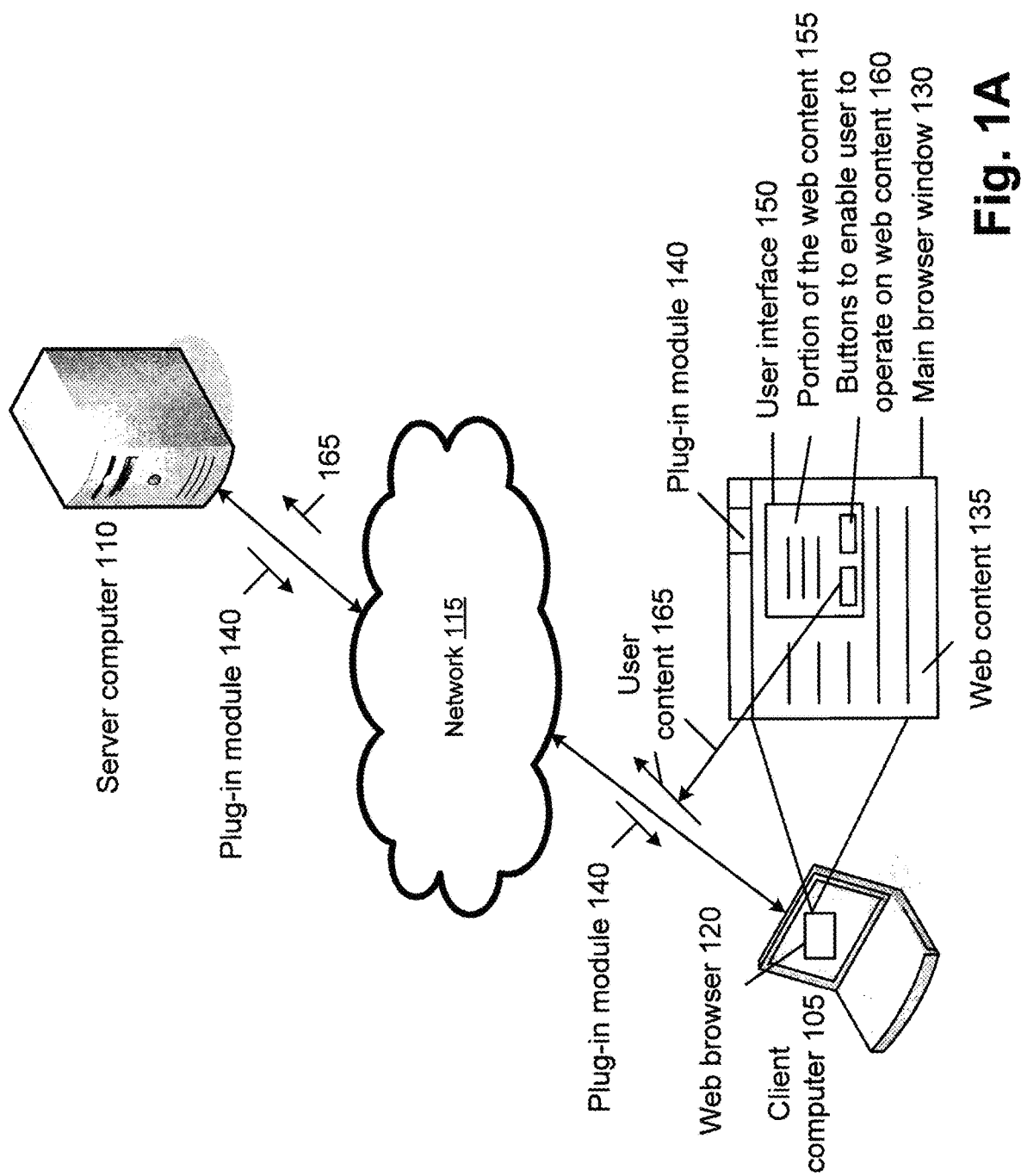
FIG. 1A is a block diagram of a client computer communicating with a server computer over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1A is a block diagram of an embodiment of a client computer 105 communicating with a server computer 110 over a network 115 such as the Internet. A user uses a web browser 120 on the client computer 105 to access the Internet. In one embodiment, a web page is transmitted via the network 115 to the client computer 105 for display by the web browser 120 in a main browser window 130. The web browser 120 displays web content 135 in the main window 130 of the web browser 120. The web content 135 is generally received from a third party server different from the server computer 110 without going through the server computer 110. The third party server is generally independent from the server computer 110; and the presentation of the web content from the third party server to the web browser 120 is made without a reference to the server computer 110. However, the techniques described herein also apply to the scenario in which the web content 135 is from the server computer 110.

In one embodiment, the client computer 105 submits a request to the server computer 110 (e.g., via the web content 135) for a plug-in module 140. The plug-in module 140 may be associated with the web content 135, may be associated with another web page, and/or may be associated with a displayed advertisement. The server computer 110 transmits the plug-in module 140 to the browser 120 (to install the plug-in module 140 on the browser 120). In one embodiment, the plug-in module 140 is installed on the browser to present a user interface element such as a button on a toolbar of the web browser 120 (e.g., the browser toolbar or a third party toolbar) or a menu item in the browser 120, etc.

The user of the client computer 105 can activate the plug-in module 140 by, for example, selecting the button for the plug-in module 140 (e.g., via a mouse cursor, touching the button, speaking a command, etc.). In one embodiment, upon activation, the plug-in module 140 causes the web browser 120 to display a user interface 150 separate from the main browser window 130 (e.g., a pop-up window). In one embodiment, the user interface 150 displays at least a portion of the web content 155 to the user and enables the user to operate on the displayed web content 155 (and, e.g., generate user content associated with the web content 135, such as a rating, comment, etc. as described below). In one embodiment, the user interface 150 includes one or more buttons 160 to enable the user to operate on the portion of the web content 155. In one embodiment, the plug-in module 140 transmits user content 165 to the server computer 110 (e.g., for indexing).

For purposes of this disclosure, a computer such as the client computer 105 includes a processor and memory for storing and executing program code, data and software. Computers can be provided with operating systems that allow the execution of software applications in order to manipulate data. Client computer 105 can be any device that can display a website and that can be used by a user. Personal computers, servers, personal digital assistants (PDAs), wireless devices, smartphones, cellular telephones, tablet computers, internet appliances, media players, home theater systems, and media centers are several non-limiting examples of computers.

For the purposes of this disclosure, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server. A number of program modules and data files can be stored on a computer readable medium of the server. They can include an operating system suitable for controlling the operation of a networked server computer, such as the WINDOWS 7, WINDOWS VISTA, or WINDOWS XP operating system published by Microsoft Corporation of Redmond, Wash., or the Ubuntu operating system distributed by Canonical Ltd. of Douglas, Isle of Man.

In one embodiment, the server computer 110 is a group of servers, such as one server to receive the submitted user content transmitted from the plug-in module 140 and a second server configured to download/install the plug-in module 140 into the user's web browser 120. In another embodiment, server computer 110 performs both of these functions. In one embodiment, a third server may be present in FIG. 1A representing a third party web server on the Internet (e.g., an online newspaper site, a blog, etc.) that is separate and distinct from server computer 110.

Figure 1B:
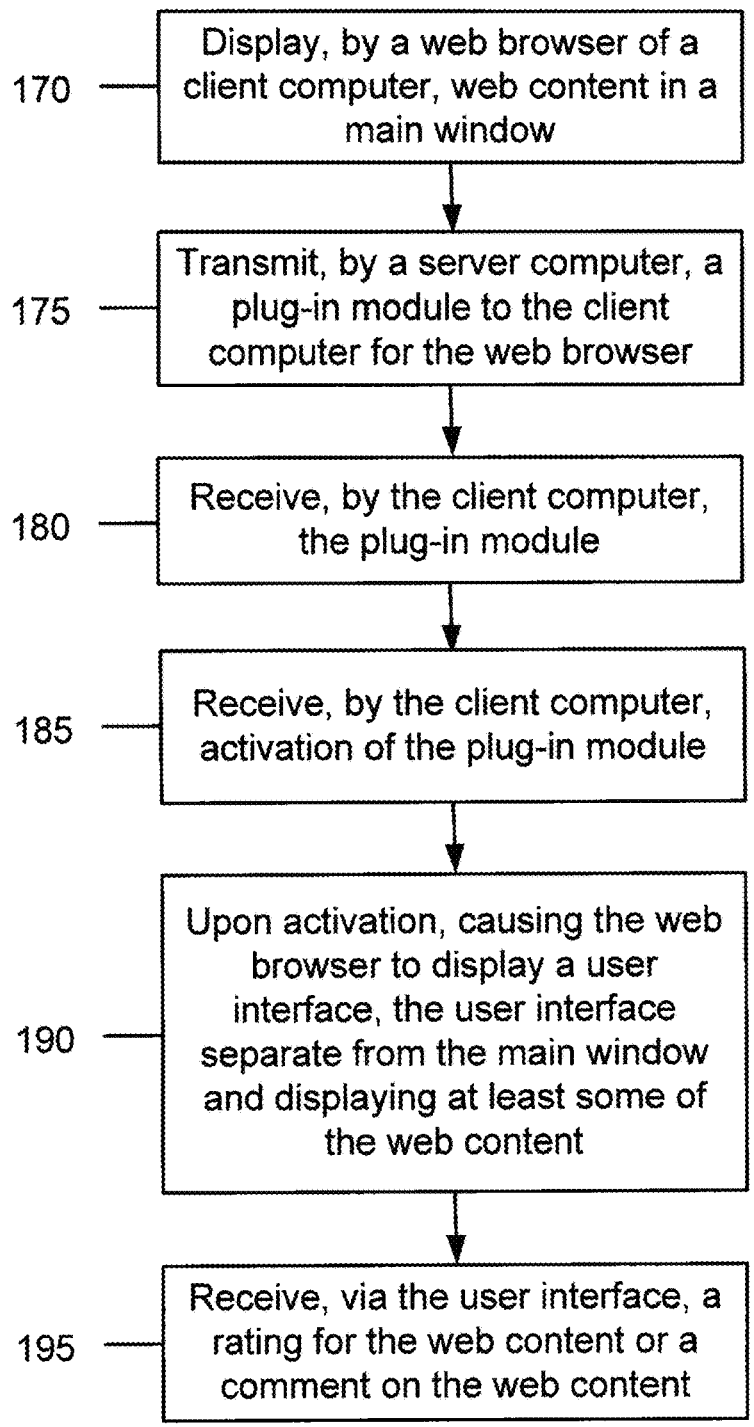
FIG. 1B is a flowchart illustrating operations performed by the server computer and the client computer to enable a user of the client computer to operate on web content displayed by the client computer in accordance with an embodiment of the present disclosure.

FIG. 1B is a flowchart illustrating an embodiment of operations performed by the server computer 110 and the client computer 105 to enable a user of the client computer 105 to operate on web content displayed by the browser 120. The user uses the web browser 120 to view and/or listen to web content 135, such as a web page, an audio file, a video, a post, a media file, etc., in main browser window 130 (Operation 170). In one embodiment, the plug-in module 140 is installed prior to and independent from the web content 135; the installation of the plug-in module 140 and its operation requires no prior arrangement made in the web content 135; and thus, the plug-in module 140 can work with any web content 135 found in the web. Alternatively, the web content 135 (e.g., a web page associated with the server computer 110) enables the user to install plug-in module 140. In another embodiment, the web page 135 is a third party web page that includes an advertisement to install the plug-in module 140.

The server computer 110 transmits the plug-in module 140 to the web browser 120 of the client computer 105 (Operation 175) and the client computer 105 receives the plug-in module 140 (Operation 180). In one embodiment, the plug-in module 140 allows the user to remotely log into the server computer 110. Upon activation of the plug-in module 140 (Operation 185), the plug-in module 140 causes the web browser 120 to display user interface 150 separate from the main window 130. In one embodiment, the user interface 150 displays at least a portion of the web content 155 that the web browser 120 is displaying in its main window 130 (Operation 190). For example, the user interface 150 can display representative information of the web content 135, such as a picture, an icon, a sentence, and/or a paragraph in the portion of the web content 155. In one embodiment, the user interface 150 displays notifications, comments, or reviews from other users who have downloaded the plug-in module 140.

In one embodiment, the user interface 150 automatically selects for display the portion of the web content 155 from the received web content 135. Further, in one embodiment the user of the client computer 105 can provide settings as to what the user interface 150 will display when web content 135 is displayed in the web browser 120 (e.g., display the first few sentences of the web content 135, display the first graphic and first few sentences of web content 135, display the entire web page 135, etc.)

The plug-in module 140 enables the user to operate on the web content 155. For example, the user can submit a rating for the web content 155 or a comment on the web content 155 (Operation 195) (e.g., user content 165). In one embodiment, the user interface 150 enables the user to post the portion of the web content 155 to a social networking site (e.g., FACEBOOK®). In one embodiment, the user interface 150 displays current discussions related to the web content 155 and enables the user to add the web content 135 to a search engine associated with the server computer 110. In one embodiment, the user can use the user interface 150 to adjust (e.g., add web content to or remove web content from) the portion of the web content 155 displayed by the user interface 150. For example, the plug-in module 140 can transmit the URL of the web content 135 to the server computer 110. The server computer 110 can update what is displayed by or the amount of web content 155 displayed by the user interface 150. In one embodiment, the plug-in module 140 prompts the user to add the web page 135 to the server computer's index so that the web page 135 will be present in future search results. The plug-in module 140 may transmit the URL of the web page 135 to the server computer 110 (which can then extract the web content 135), may transmit the entire web page 135 to the server computer 110, or may transmit a portion of the web page 135 to the server computer 110. In one embodiment, the server computer 110 (or the plug-in module 140) grabs the web page's meta-tags, thumbnail, title, and/or text of the web page 135. In one embodiment, the plug-in module 140 allows the user to add web content 135 (e.g., a web page) to the server computer 110, such as via the user interface 150, a pop-up window, a menu option, right-clicking the webpage itself, via the browser 120, etc. In one embodiment, the plug-in module 140 enables the user to change the web content's tags in case the meta-tags are inaccurate.

Thus, the user interface 150 enables the user to provide information/content about a third party web page 135 to a web page associated with the plug-in module 140 (and server computer 110) while the third party web page 135 is displayed in web browser 120. This information/user content 165 can include one or more comments, tips, a rating for the web content 155 (e.g., a score for the web content 155), an indication that the user likes or dislikes the web content 155, a recommendation for or on the web content 155, and/or a tag for the web content 155. Further, the user interface 150 can enable the user to attach content to the web content 155, share the web content 155 with others, etc.

The plug-in module 140 allows the user to act on any web page that is currently being viewed by the user and, in one embodiment, transmits the user-created content (e.g., comments and ratings) in association with an identification of the web content to the server computer 110. After the plug-in module 140 is installed on the web browser 120 (e.g., via an installation web page that directs the user to download the plug-in module 140 for installation), the user can visit any third party web site and click a button associated with the plug-in module 140 to create user content in association with the third party web site and submit the user content to the server computer 110. The user does not have to visit the web site through the plug-in module 140 or user interface 150 but rather can navigate to the web site using the user's web browser 120. In one embodiment, the plug-in module 140 can be implemented as a built-in module of the web browser 120 (e.g., shipped by Microsoft Corporation as a built-in component of INTERNET EXPLORER®).

Thus, when a user is looking at a web page (e.g., a news article or a blog entry), and if the user is interested in acting upon it (e.g., to share it, to submit it to the server computer 110 for indexing, or to rank or comment on it), the user can click on the plug-in module button and then work on the user interface 150 that, in one embodiment, populates some of the fields automatically by automatically taking those contents (e.g., snippets) from the web page 135 that the user is currently looking at (e.g., thumbnail image, the lead sentence, etc.). There is no need for any prior arrangement between the web page being acted upon and the plug-in module 140/server computer 110.

For example, a blog-related service may use such a plug-in module 140 to assist the blog author that blogs on news articles. When looking at the news article, the user clicks the plug-in button and the user interface 150 shows the blog template that has many fields pre-populated with content from the news article (e.g., a thumbnail icon image, a lead sentence, etc.). Thus, the user does not have to perform the copy and paste manually. The user can work on the user interface 150 to compose the remaining part of the blog entry about the news article, such as rating, comments, etc.

In one embodiment, the user interface 150 displays advertisements to the user, such as for one or more products. In one embodiment, the advertisements are transmitted to the browser 120 by the server computer 110. Alternatively, a third party advertisement server can transmit advertisements to the user interface 150 for display. In one embodiment, the advertisements may be related to the portion of the web content 155 displayed by the user interface 150. The user interface 150 can also display statistics. For example, the user interface 150 can display statistics associated with the portion of the web content 155, statistics associated with the user (e.g., number of days since the user has downloaded the plug-in module 140, amount of web content that the user has commented on, amount of web content that the user has shared, amount of web content that the user has rated or ranked, number of and/or which other users the user has followed, number of and/or which other users have followed the user, etc.), statistics about the user interface 150, statistics about the plug-in module 140, statistics about other users associated with the plug-in module 140 (e.g., the number of users who have downloaded the plug-in module 140 and/or the number of users who have downloaded the plug-in module 140 and who have currently activated the plug-in module 140 to view a corresponding user interface), and/or statistics about any other information.

In one embodiment, the user interface 150 displays advertisements that are posted by other users who have downloaded the plug-in module 140. The advertisements can be, for example, an advertisement for a roommate, an advertisement to sell or buy a product, a classified jobs section, a dating section, etc. Thus, in one embodiment, a product manager at company XYZ can post a job position that is available at XYZ to the users of the plug-in module 140. As another example, suppose one user is using his web browser 120 to search for a new television set. In one embodiment, the plug-in module 140 can detect the user's searching and post an advertisement for a TV that another user in the community (e.g., another user who has downloaded the plug-in module 140) is selling.

For each web item (web content) (e.g., a web site, a video, a web page) hosted on the web/internet (typically not on the server computer 110), the server computer 110 allows its users to create user content 165, which typically includes a snippet or portion of the web content 155 (such as one or sentences from the web content 135, one or more thumbnail images of the web content 135, etc.). The snippet 155 is not generated until a user submits it to the server via the plug-in module 140. The user content 165 may further include a set of tags/keywords. The plug-in module 140 and/or the server 110 may automatically select the snippet and the tags/keywords 155 for the user, by processing the web content 135 in an automated way. The snippet and/or the tags/keywords 155 suggested by the plug-in module 140 and/or the server computer 110 may be modified by the user via the user interface 150 of the plug-in module 140. The snippet 155 is stored on the server computer 110 (as part of the user content 165 associated with the web content 135); and in one embodiment the user content 165 has a link to the web content 135, which allows the users of the server computer 110 to follow the link to see the actual/current version of the web content 135 that is on the web (typically not on the server computer 110). One or more users can add additional contents to the "user content" 165 associated with the web content 135, such as a vote/rating, and a comment. The first user submitting the snippet and/or tags/keywords can submit this information with his/her rating/vote and comment.

Figure 2A:
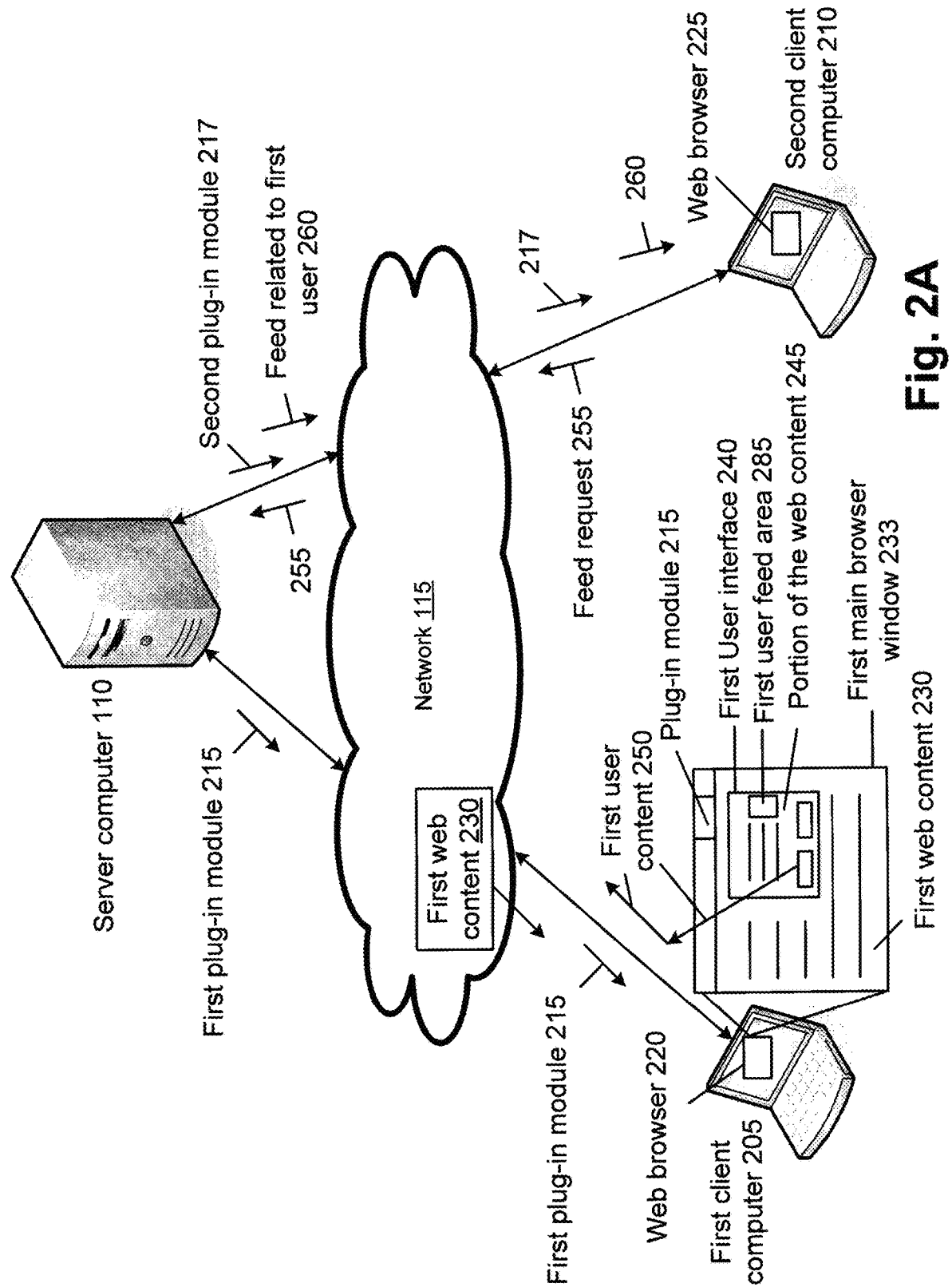
FIG. 2A is a block diagram of a first client computer and a second client computer communicating with the server computer in accordance with an embodiment of the present disclosure.
Figure 2B:
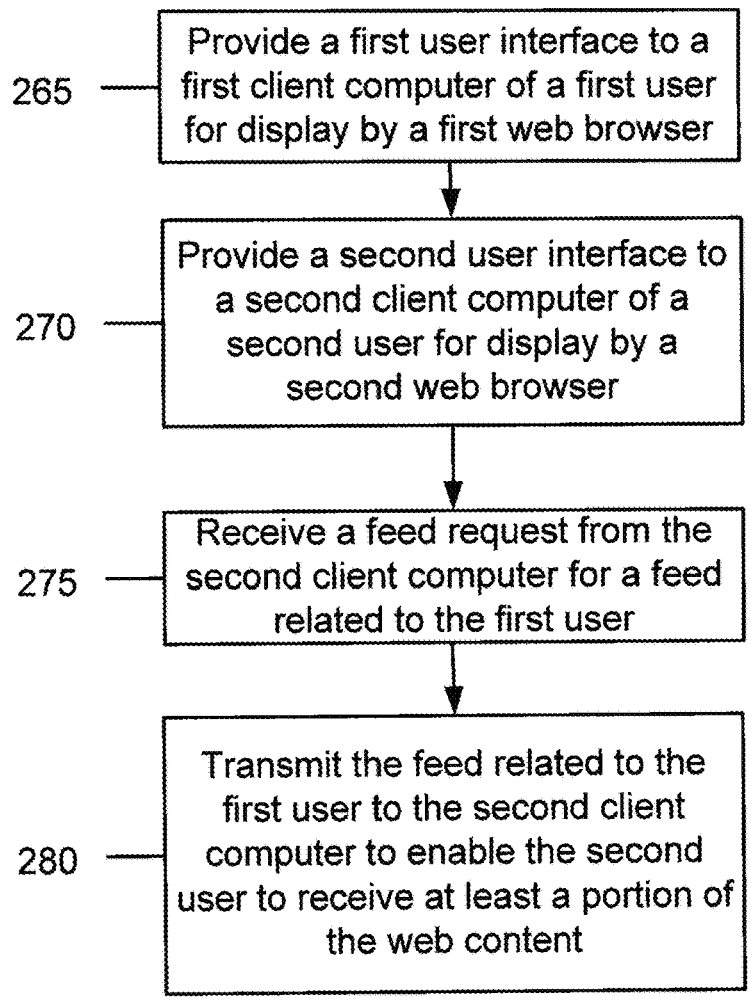
FIG. 2B is a flowchart illustrating operations performed by the server computer to transmit a feed to the second client computer in accordance with an embodiment of the present disclosure.

FIG. 2A is a block diagram of an embodiment of a first client computer 205 and a second client computer 210 communicating with the server computer 110 over network 115. FIG. 2B is a flowchart of an embodiment of operations performed by the server computer 110. As described above, in one embodiment the plug-in module 215, 217 is transmitted to web browser 220 of the first client computer 205 and web browser 225 of the second client computer 210, respectively. Each web browser 220, 225 is displaying web content (e.g., the first web browser 220 is displaying first web content 230) as described above in a main browser window (e.g., first main browser window 233). In one embodiment, the user of the first client computer 205 activates plug-in module 215, which in turn results in a corresponding first user interface 240 being displayed. Alternatively, the first user interface 240 is displayed in a web page served by the server computer 110. The first user interface 240 displays a portion of the web content 245. As described above, the user of the first client computer 205 can act upon the first web content 230 displayed by the web browser 220 of the first client computer 205 to generate first user content 250.

As described above, the server computer 110 provides a first user interface 240 to the first client computer 205 of the first user for display by the first web browser 220 (Operation 265). The server computer 110 also provides a second user interface to the second client computer 210 of a second user for display by the second web browser 225 (Operation 270).

In one embodiment, the user interfaces (e.g., first user interface 240) provides a way for users to instantly (in real-time) share information that one user believes would be of special interest to another user. This may be done via feeds. Feeds can be used to alert other users of, for example, webpages, shared (ideas), tips, and photos. In one embodiment, the user interface takes a newsfeed entry and redirects it to another user's feed. In one embodiment, comments that are entered in a feed are updated (e.g., regularly), and entered comments can be found in a webpage discussion page. In one embodiment, the server computer 110 (user interface) does not generate duplicate entries.

In one embodiment, the second user submits a feed request 255 for a feed related to the first user to the server computer 110. The server computer 110 receives the feed request (Operation 275). In one embodiment, the server computer 110 transmits the feed related to the first user 260 to the second client computer 210 to enable the second user to receive at least a portion of the first web content 230 (Operation 280) (e.g., a thumbnail version of a picture from the web content, a sentence from the web content, and/or a link to or in the web content). The feed can be sent in search results, newsfeed, and in a plug-in pop-up displayed by the user interface of the second client computer 210. In another embodiment, the users are provided with access to reply to the feed(s); and thus users can start a conversation using the feed(s). The feed(s) serve as a way to communicate between a selected group of people. Users may also subscribe to certain tags to receive feeds that are generated via an automatic search of the followed tags.

In one embodiment, the transmitting of the feed related to the first user to the second client computer 210 to enable the second user to receive at least a portion of the web content further includes enabling the second user to reply to the at least a portion of the web content. In one embodiment, the transmitting of the feed includes transmitting search results including the at least a portion of the web content to the second user.

In one embodiment, the feed is transmitted to the second user interface in real-time when the second user has activated his corresponding user interface (e.g., has logged in or is displaying the user interface). In another embodiment, if the second user has not activated his user interface (e.g., via the plug-in module), the server computer 110 stores the feed and pushes the feed to the second client computer 210 when the second user activates the second user's plug-in module. Thus, in one embodiment the feed is similar to instant messaging and email. The presentation, in one embodiment, is similar to blog postings in blogs.

In one embodiment, the user interface enables a user to follow another user. For example, if the second user follows the first user, certain content of the first user is fed to the second user via a feed. In one embodiment, permissions are used for users as a way for users to control who can interact with them and how. Users may register to follow other people to populate their feeds with relevant information. However, should a user find that another user that he/she is following to be too much of an annoyance for any reason, that user can block the user he/she is following in a number of ways. One way is to block the feed, which prevents the activities of a user that he/she is following from showing up on the feed. Another way a user can block another person is if the user finds a particular person's communications unwanted or an annoyance. A further way is messaging. In one embodiment, any user can message another user via the user interface. However, this can be a gateway to spamming, so by limiting the ability to message certain users, it can help create a better user experience.

In one embodiment, the user interface includes a feed area (e.g., first user feed area 285) where a user can receive real-time information of what his/her followers are doing. For example, for webpage entries, users can rate, comment, and/or find external links to the pages in this feed area. In one embodiment, there are two types of ratings—thumbs up (positive) and thumbs down (negative). In one embodiment, ratings can only be added once per user, per page/site/photo. A positive rating raises the page/site/photo's calculated score, which can cause it to appear higher in search results. This allows the users to directly decide what shows up in the highest positions in the search results. A negative rating lowers the page/site/photo's calculated score, which can cause it to appear lower in the search results. This allows the users to directly decide what shows up in the lowest positions in the search results.

Commenting on an entry in a feed allows a user to express their opinion. In one embodiment, commenting can be done multiple times per user. In one embodiment, all pages and photos displayed in the feed area are linked directly to their respective discussion pages. Any comments posted on the feed area about the websites, webpages, photos, and albums can be updated on their respective discussion pages.

In one embodiment, if another user finds a comment particularly helpful, he/she can give the comment a positive rating. Similarly, in one embodiment, if another user finds a comment not particularly helpful, he/she can give the comment a negative rating. In one embodiment, a user can sort the way his feed area displays information.

In one embodiment, if a second user uses second client computer 210 that has the plug-in installed to visit the web content that has an associated user content (e.g., a snippet, a set of votes by different users and comments) in the server computer, the browser plug-in module shows the availability of the user content (e.g., the numbers of comments the server computer 110 stores for the web content displayed in the main window and the counts of up votes and down votes) and the second user can click on the browser plug-in module to activate a user interface to view the user content and/or provide additional user content.

The second user may use a search page of the server computer and/or the user interface of the plug-in module to search, based on the tags, to discover the web content and then view the user content using the plug-in module.

In one embodiment, the first user of the first user interface 240 may directly request the server computer 110 to feed the user content to a set of other users identified by the first user, such as the user of the second client computer 210. When the second client computer 210 is in a feed user interface, the server computer 110 and/or the plug-in module of the second client computer 210 automatically presents available feeds of user contents to the second user of the second client computer 210. The server computer 110 may automatically push feeds to the feed user interface (feed area), as soon as the feed content becomes available or updated. Alternatively, the feed user interface (feed area) may periodically check with the server computer 110 for updates and/or new feeds.

The available feeds include the user content that is explicitly identified by other users (e.g., the first user of the first client computer 205) for sharing with the second user, implicitly identified by the second user via subscription to tags identified by the second user, or implicitly identified by the second user via following one or more other users (e.g., the first user as a friend who accepts the request from the second user to follow the first user). When the second user follows the first user, the user contents of interest to the first user are fed to the second user in the feed user interface (feed area) (e.g., presented via activating the plug-in module). For example, the user contents related to the web content that are commented on, voted on, and/or discovered/submitted by the first user to the server computer 110 can be fed to the second user, if the second user follows the first user, as indicated by the user following data stored in the server computer 110. In one embodiment, different types of user contents (e.g., explicitly shared by the first user to the second user, implicitly shared via following the first user, and implicitly identified via subscription to tags) are presented in different sections of the feed user interface (feed area). Duplicated items are eliminated from the sections, based on a predetermined priority (e.g., if an item is presented in the explicit shared section, the item is not show in other sections).

When a first user explicitly requests the sharing of a user content with a second user in connection with web content, the server computer 110 generates a feed in response to the user request and makes the feed available as a real time response to the user request.

When a user content is created or updated for a web item (web content), the server computer 110 checks tag subscription data to create new feeds in real time with the creation or updating of the user content (for feeding to users who subscribe to a tag assigned to the web item); in addition, the server computer 110 checks the user following data to create new feeds in real time with the creation or updating of the user content (for feeding to users who follow 1) the user who created or updated the web item and/or 2) the users who subscribed to tags to receive a feed of the user content).

Figure 3A:
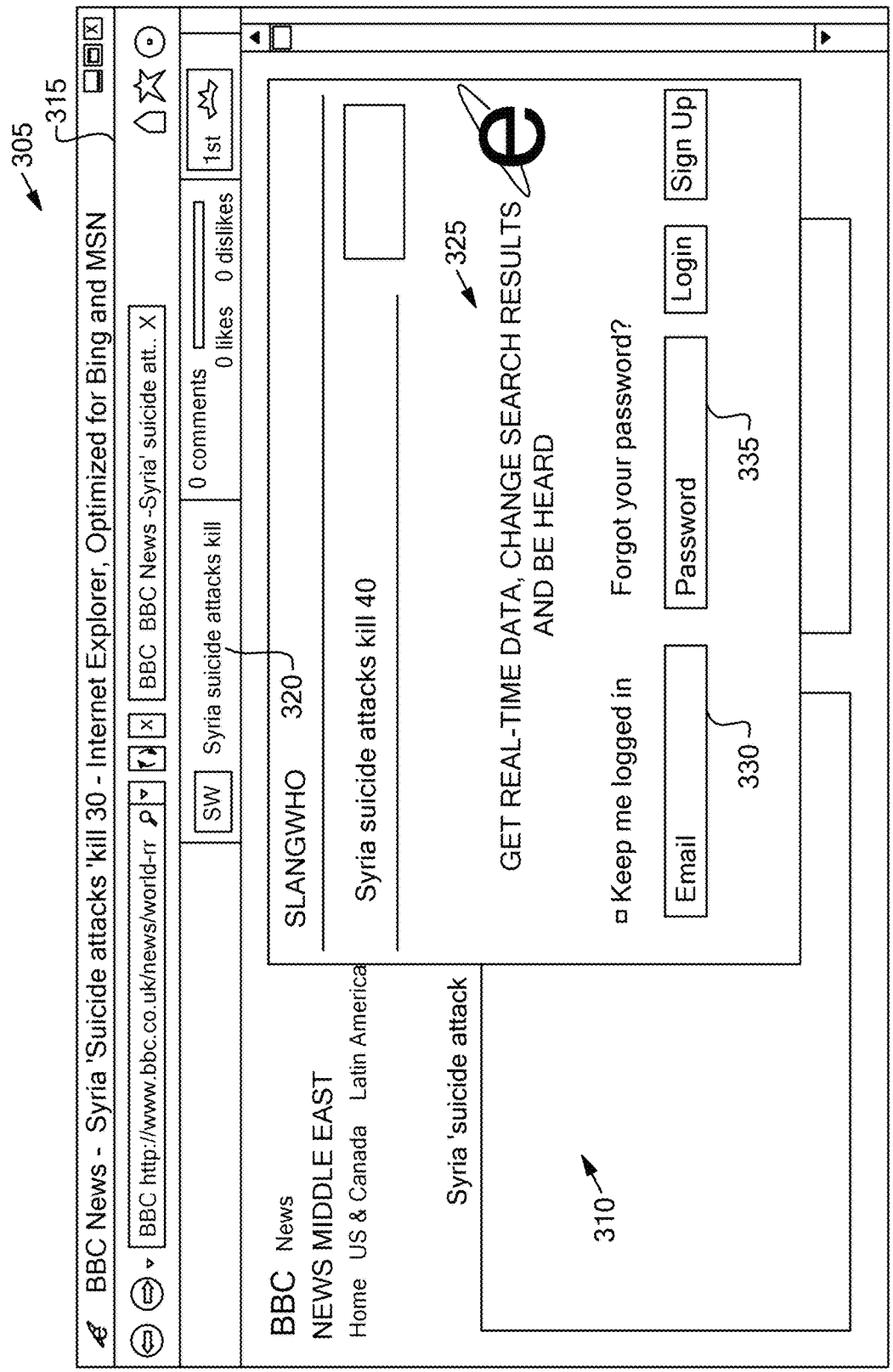
Figure 3B:
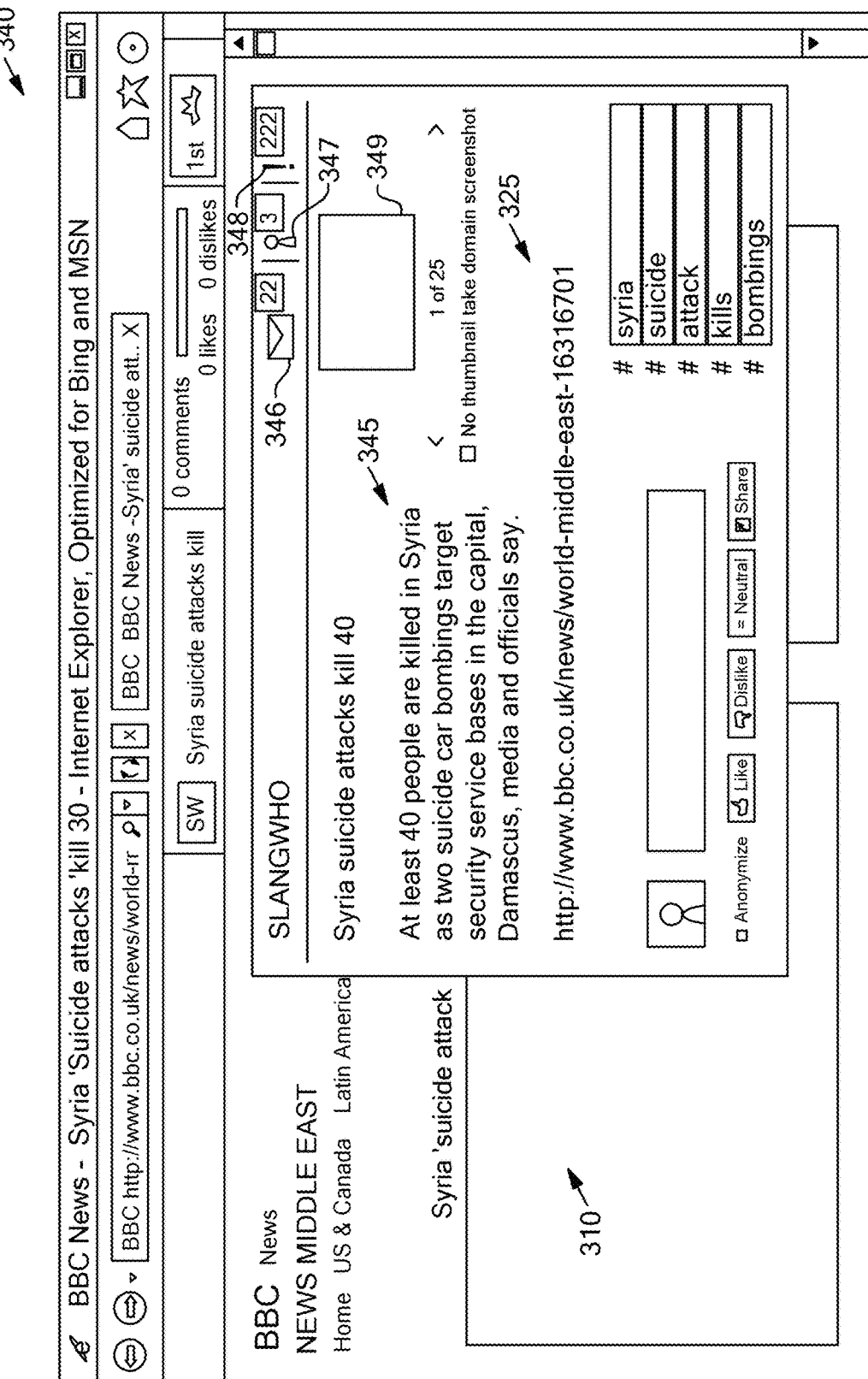

FIGS. 3A-3F are exemplary screen shots of the user interface and the plug-in module when a web page is added to the server computer 110 (e.g., added to be indexed for search results) via the plug-in module. In FIG. 3A, screen shot 305 shows web content 310 being displayed by web browser 315. The user has activated the plug-in module via plug-in module button 320, which results in user interface 325 being displayed. Screen shot 305 shows the user interface 325 enabling the user to log in via log-in input areas 330, 335. FIG. 3B shows a screen shot 340 illustrating the user interface 325 that includes a portion of the web content 345 associated with web content 310. The user in screen shot 340 can enter in a comment relating to the portion of the web content 345. In FIG. 3B, the envelop icon 346 with the number (22) may be an interface to open the section to see the explicitly shared feeds; the person icon 347 with the number (3) may be related to the user interface for following other users (and/or feeds via following); and the "!" icon 348 with the number (222) may be for feeds or for feeds via subscription to tags. In FIG. 3B, the thumbnails of all pictures are arranged in a slide show mode 349 to allow the user to view the pictures one at a time. The option below the slide show allows the user to select an alternative way to present the web page visually: generating a domain screenshot of the web page, instead of creating the thumbnail images of pictures in the web page (some web pages may not have a picture). The option to the left of the "like" voting button can be selected to submit the user content anonymously. The comment of the user submitted anonymously will be shown to others without revealing the identity of the user who requested to submit the comment with the "anonymize" option.

Figure 3C:
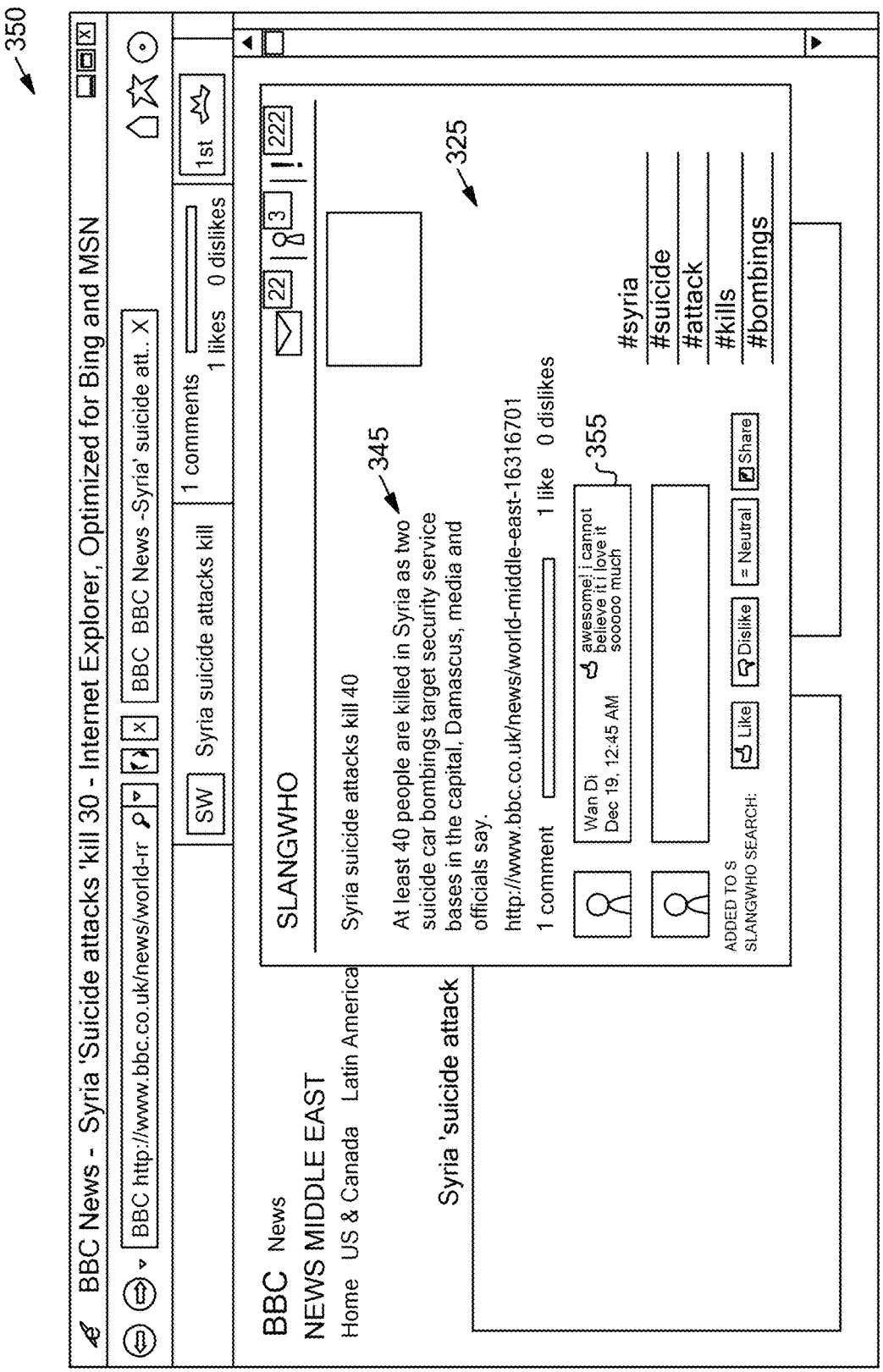
Figure 3D:
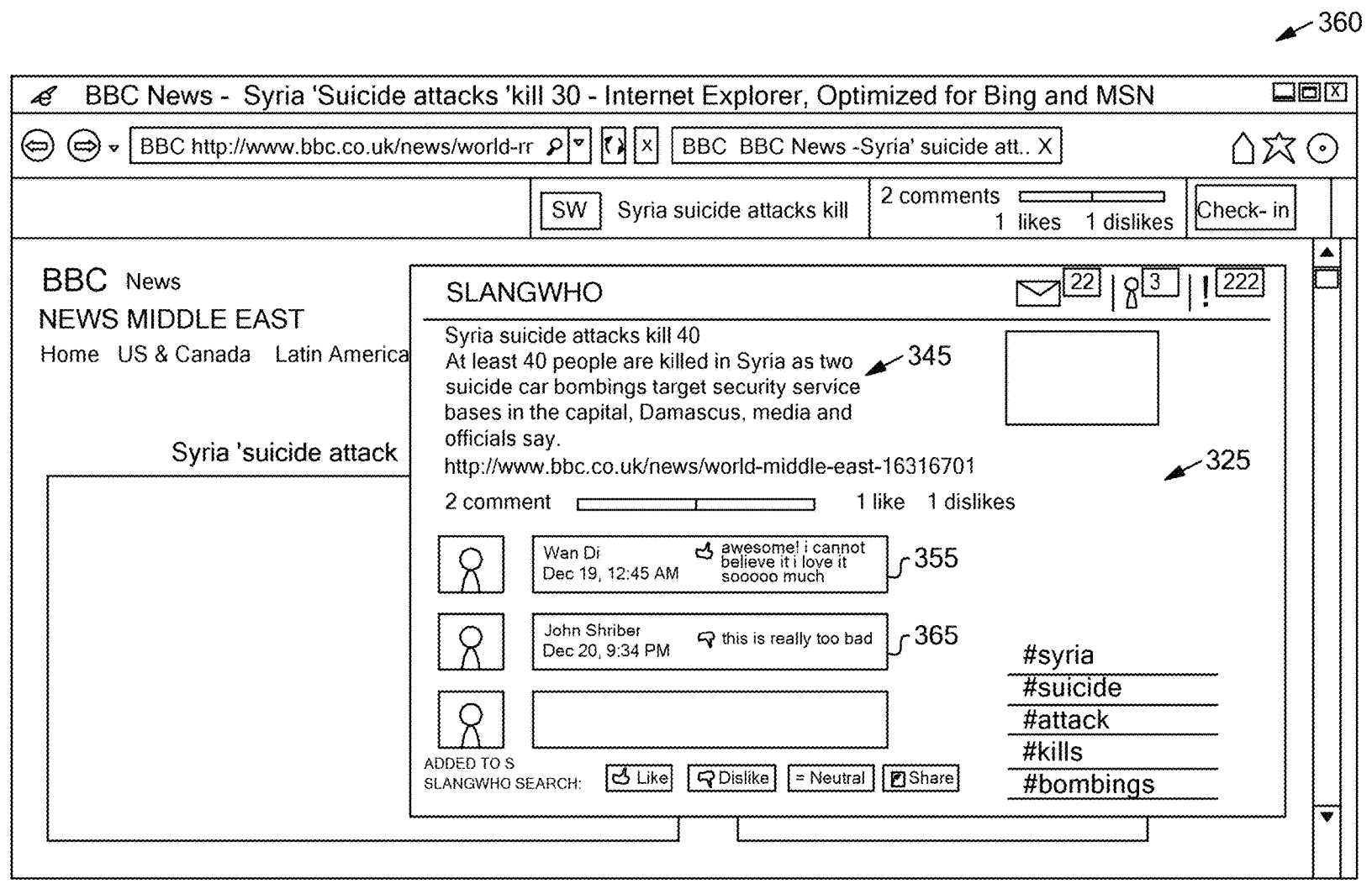
Figure 3E:
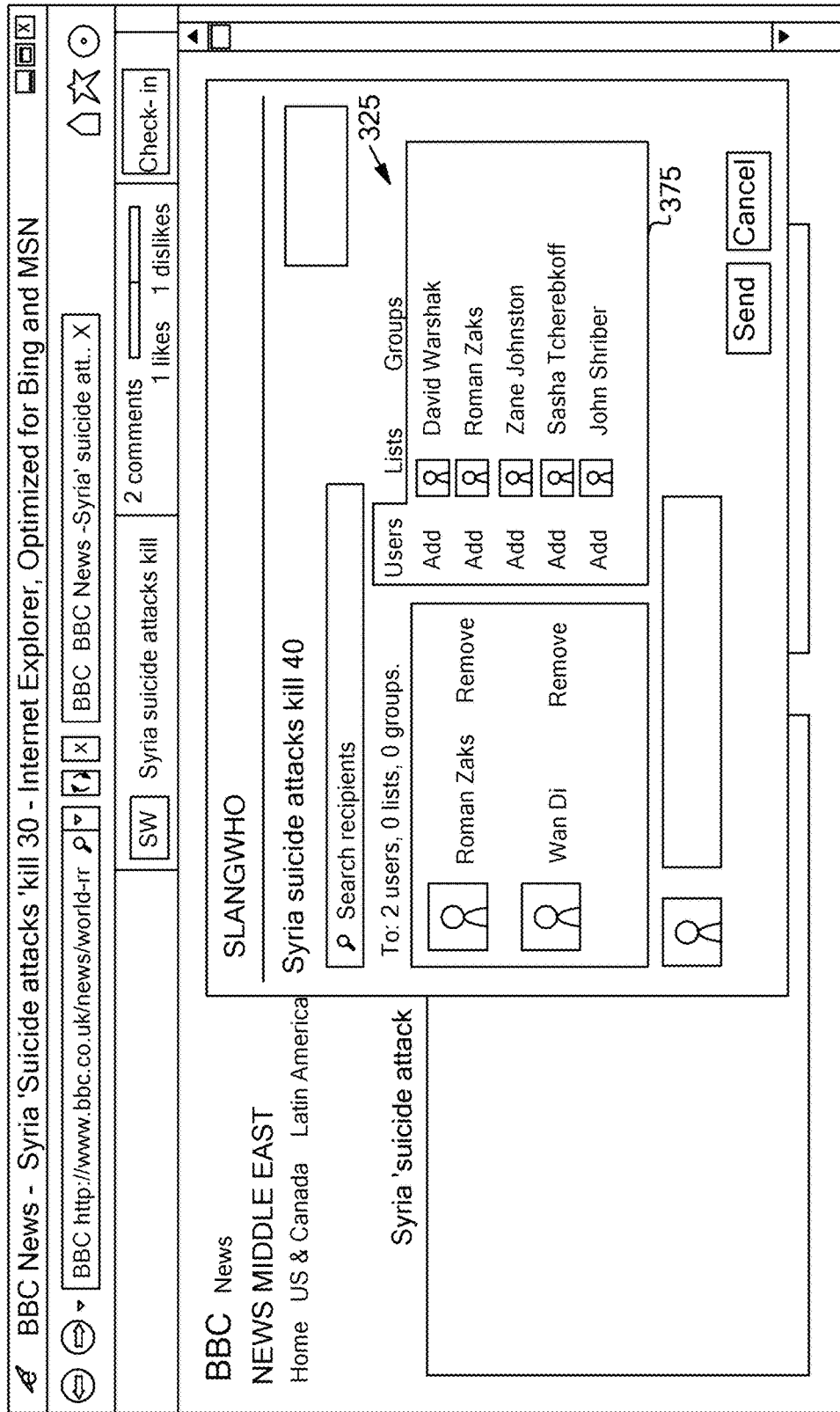
Figure 3F:
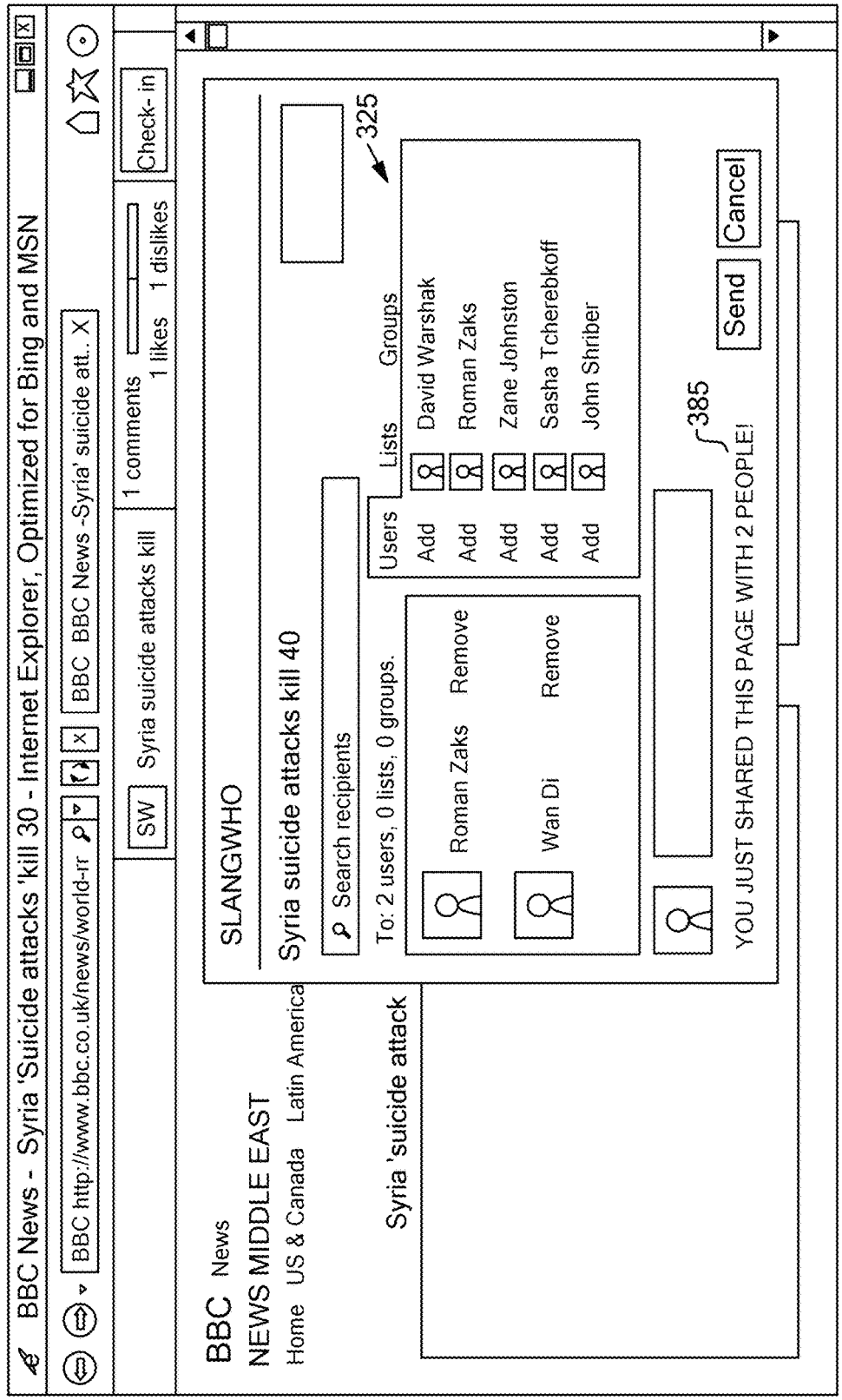

FIG. 3C shows a screen shot 350 that includes user interface 325 having a comment 355 from the user about the portion of the web content 345. The user has indicated that he/she "likes" the web content 345. FIG. 3D is a screen shot 360 of user interface 325 displaying two comments, the like comment 355 and a dislike comment 365. FIG. 3E shows a screen shot 370 with user interface 325 displaying contacts 375 that the user can share the web content 345 with. FIG. 3F shows a screen shot 380 with user interface 325 indicating via notification 385 that the user has shared the web content 345 with two people.

Figure 4A:
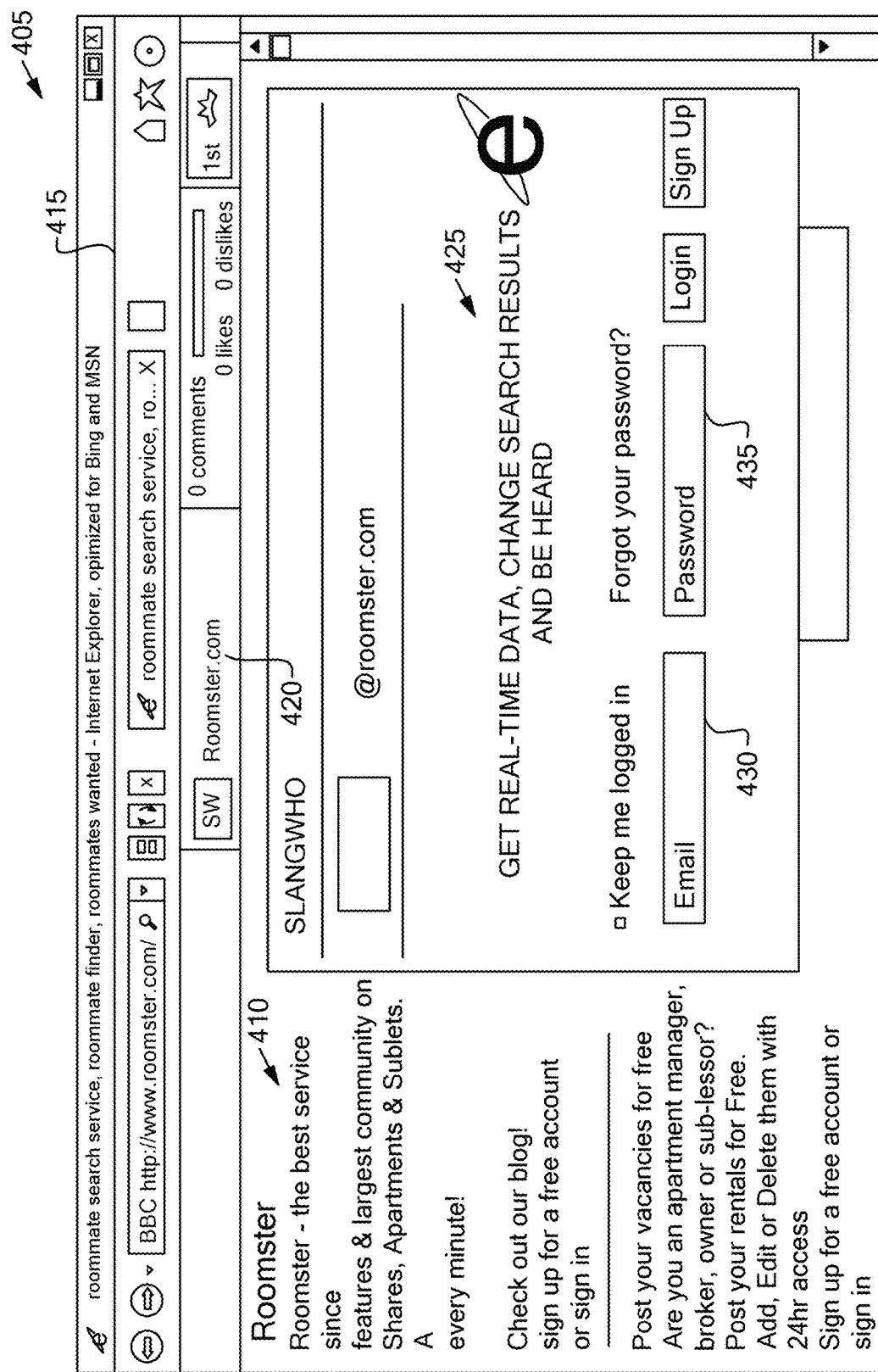
Figure 4E:
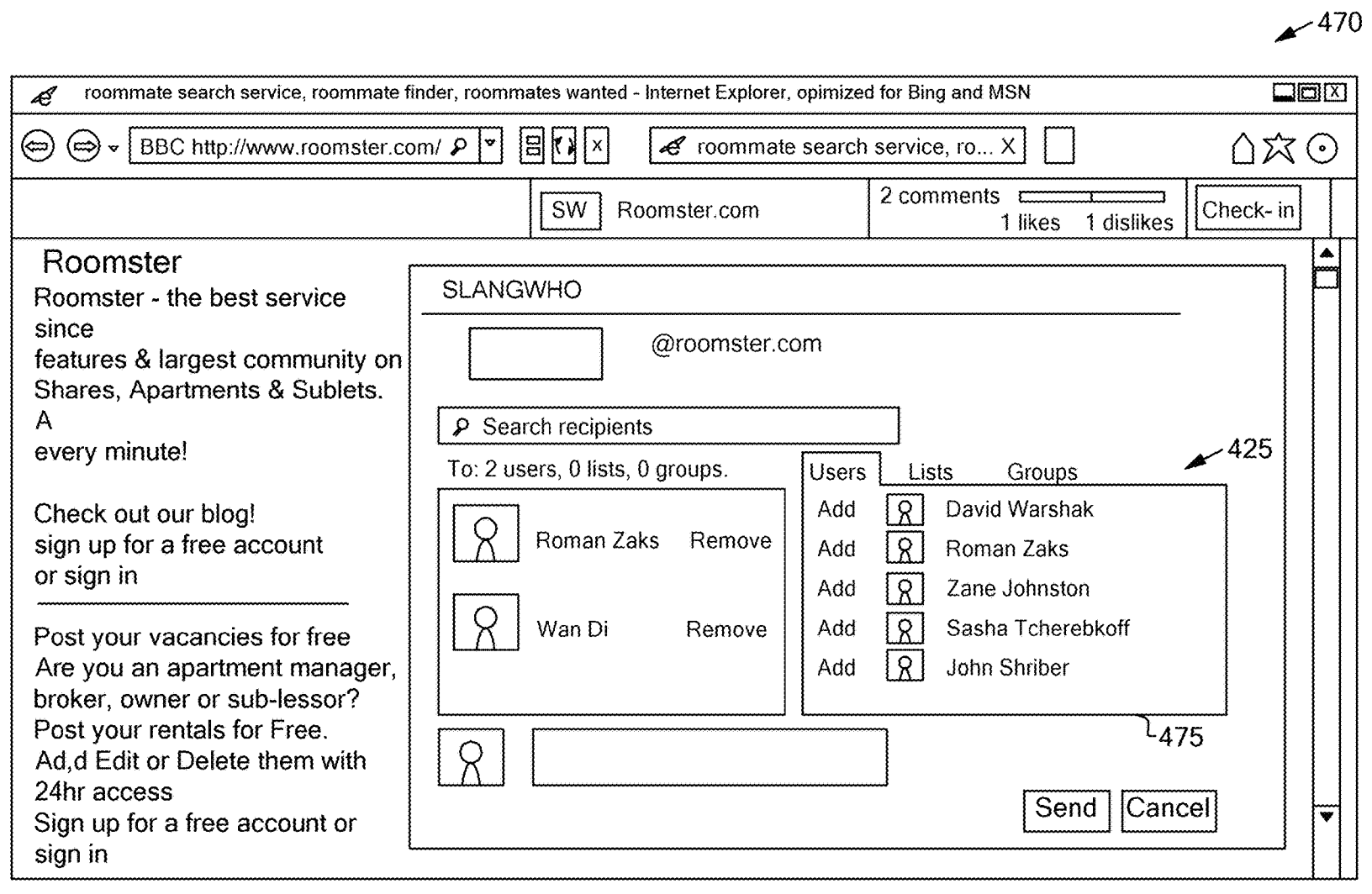
Figure 4F:
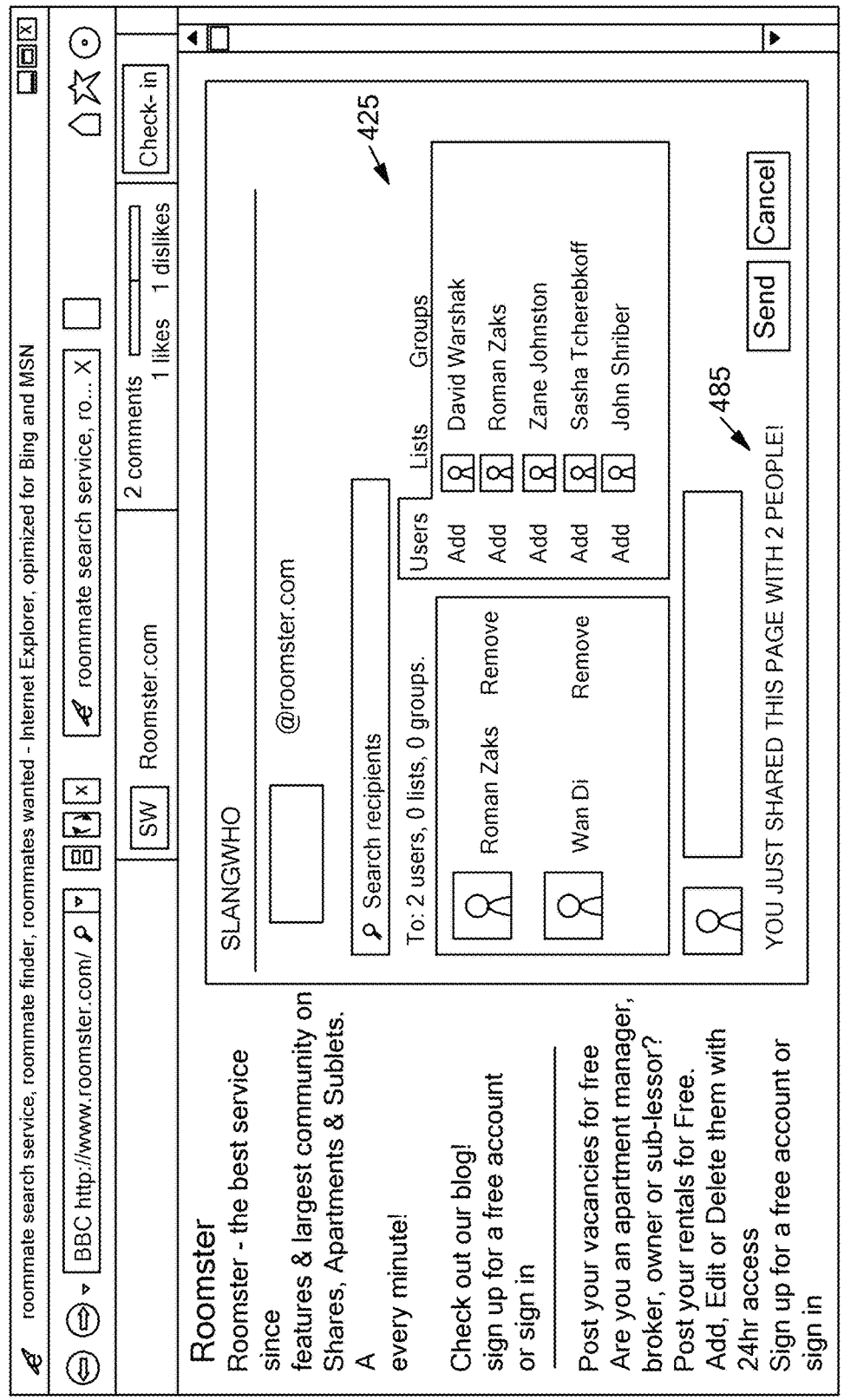

FIGS. 4A-4F are exemplary screen shots of the user interface and the plug-in module when a web site is added to the server computer 110 (e.g., added to be indexed for search results) via the plug-in module. In FIG. 4A, screen shot 405 shows web site 410 being displayed by web browser 415. The user has activated the plug-in module via plug-in module button 420, which results in user interface 425 being displayed. Screen shot 405 shows the user interface 425 enabling the user to log in via log-in input areas 430, 435. FIG. 4B shows a screen shot 440 illustrating the user interface 425 that includes a portion of the web site content 445 associated with web site 410. The user in screen shot 440 can enter in a comment relating to the portion of the web content 445. FIG. 4C shows a screen shot 450 that includes user interface 425 having a comment 455 from the user about the portion of the web site content 445. The user has indicated that he/she "likes" the web site content 445. FIG. 4D is a screen shot 460 of user interface 425 displaying two comments, the like comment 455 and a dislike comment 465. FIG. 4E shows a screen shot 470 with user interface 425 displaying contacts 475 that the user can share the web site content 445 with. FIG. 4F shows a screen shot 480 with user interface 425 indicating via notification 485 that the user has shared the web site content 445 with two people.

Figure 5:
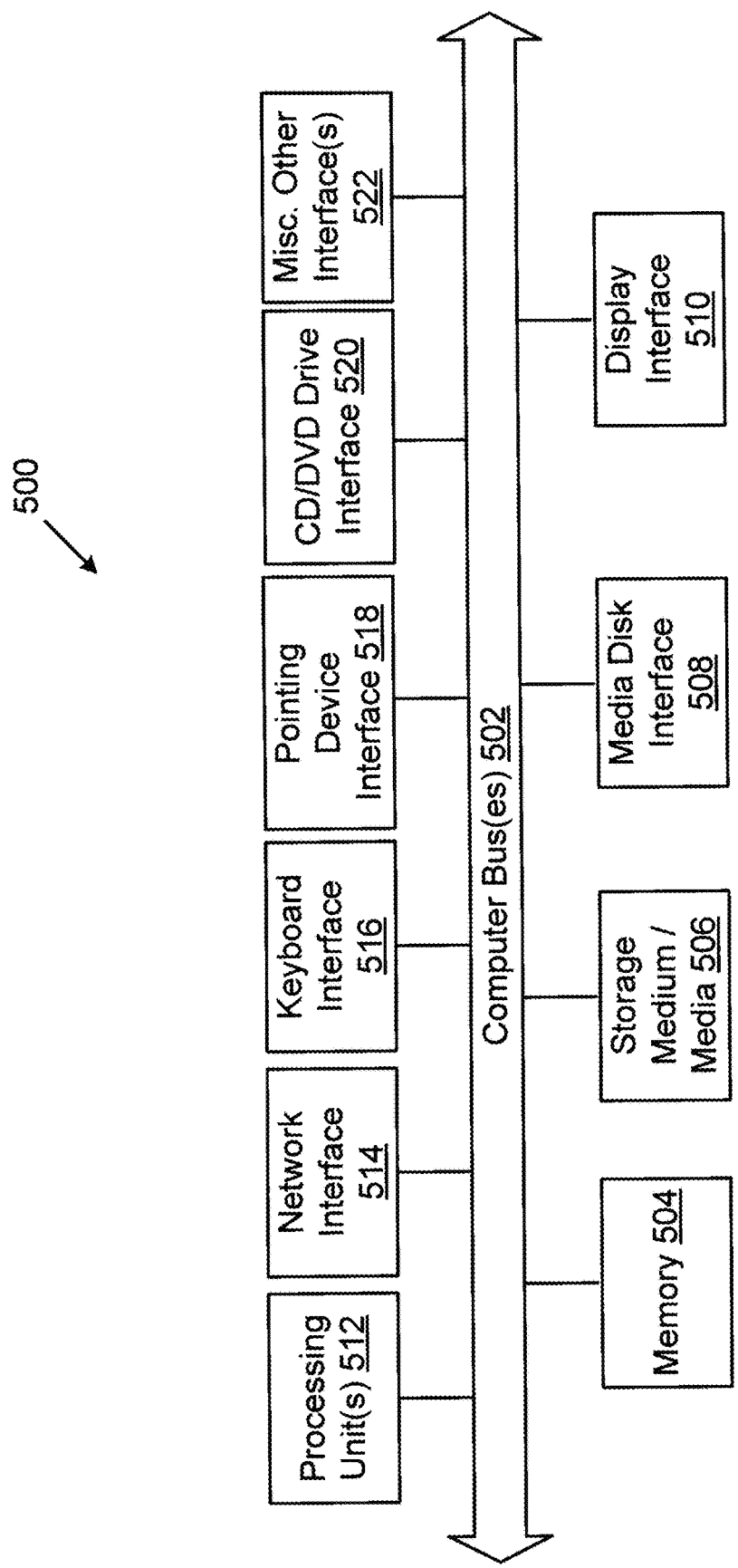
FIG. 5 is a block diagram illustrating an internal architecture of a computer in accordance with an embodiment of the present disclosure.

FIG. 5 is a block diagram illustrating an internal architecture of an example of a computer, such as server computer 110 and/or client computer 105, in accordance with one or more embodiments of the present disclosure. A computer as referred to herein refers to any device with a processor capable of executing logic or coded instructions, and could be a server, personal computer, set top box, smart phone, pad computer or media device, to name a few such devices. As shown in the example of FIG. 5, internal architecture 500 includes one or more processing units (also referred to herein as CPUs) 512, which interface with at least one computer bus 502. Also interfacing with computer bus 502 are persistent storage medium/media 506, network interface 514, memory 504, e.g., random access memory (RAM), run-time transient memory, read only memory (ROM), etc., media disk drive interface 508 as an interface for a drive that can read and/or write to media including removable media such as floppy, CD-ROM, DVD, etc. media, display interface 510 as interface for a monitor or other display device, keyboard interface 516 as interface for a keyboard, pointing device interface 518 as an interface for a mouse or other pointing device, and miscellaneous other interfaces not shown individually, such as parallel and serial port interfaces, a universal serial bus (USB) interface, and the like.

Memory 504 interfaces with computer bus 502 so as to provide information stored in memory 504 to CPU 512 during execution of software programs such as an operating system, application programs, device drivers, and software modules that comprise program code, and/or computer-executable process operations, incorporating functionality described herein, e.g., one or more of process flows described herein. CPU 512 first loads computer-executable process operations from storage, e.g., memory 504, storage medium/media 506, removable media drive, and/or other storage device. CPU 512 can then execute the stored process operations in order to execute the loaded computer-executable process operations. Stored data, e.g., data stored by a storage device, can be accessed by CPU 512 during the execution of computer-executable process operations.

Persistent storage medium/media 506 is a computer readable storage medium(s) that can be used to store software and data, e.g., an operating system and one or more application programs. Persistent storage medium/media 506 can also be used to store device drivers, such as one or more of a digital camera driver, monitor driver, printer driver, scanner driver, or other device drivers, web pages, content files, playlists and other files. Persistent storage medium/media 506 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A computer-implemented method comprising:
receiving, by a computing device, a submission associated with web content from a first user via a first client computer, wherein the submission includes a portion of the web content;
receiving, by the computing device, a request from the first user via the first client computer to provide the submission to a second user of a second client computer;
in response to the request to provide the submission to the second user, selectively transmitting, by the computing device, a feed to the second client computer to present the submission to the second user as a real time response to the request; and
providing, by the computing device, a plug-in module to the second client computer, the plug-in module for displaying a user interface separate from a main window of a browser to present the submission to the second user,
wherein the selectively transmitting is performed in response to determining the second user has activated the plug-in module; and
wherein the selectively transmitting is not performed in response to determining the second user has not activated the plug-in module,
wherein in response to the selectively transmitting not being performed, storing the feed and pushing the feed to the plug-in module when the plug-in module is activated.

2. The method of claim 1, wherein the computing device automatically pushes the feed to the second client computer as content of the feed becomes available.

3. The method of claim 1, wherein the computing device automatically pushes the feed to the second client computer as content of the feed is updated.

4. The method of claim 1, wherein the request from the first user identifies a plurality of other users to provide the submission to, and wherein the feed is provided to each of the plurality of other users in response to the request from the first user.

5. The method of claim 1, wherein the feed is generated in response to the request to provide the submission to the second user.

6. The method of claim 1, wherein the submission includes one or more of: a webpage, an image, video, text, and audio.

7. The method of claim 1, further comprising providing, by the computing device, a second plug-in module to the first client computer for displaying a user interface by a web browser operating on the first client computer, wherein the user interface automatically selects a portion of web content displayed by the web browser and displays the portion of the web content within the user interface.

8. The method of claim 7, wherein the user interface displayed by the web browser operating on the first client computer is configured to display a list of one or more contacts with whom the first user can select to share the submission, wherein the second user is included in the list of one or more contacts.

9. The method of claim 7, wherein the plug-in module for displaying a user interface separate from a main window of a browser to present the submission to the second user activates the user interface in response to input from the first user.

10. The method of claim 7, wherein the user interface displayed by the web browser operating on the first client computer is separate from a main window of the web browser operating on the first client computer.

11. The method of claim 7, wherein the user interface displayed by the web browser operating on the first client computer further displays content received from the second user and associated with the web content.

12. The method of claim 11, wherein the content from the second user includes one or more of: a notification, a comment, and a review.

13. The method of claim 7, wherein the portion of the web content displayed by the user interface displayed by the web browser operating on the first client computer is configurable by the first user via the user interface.

14. The method of claim 13, wherein configuring the portion of the web content to be displayed by the user interface displayed by the web browser operating on the first client computer includes receiving, from the user via the user interface, a command to display one of: a portion of text from the web content, one or more images from the web content, a combination of text and one or more images from the web content, and the entire web content.

15. The method of claim 7, wherein the portion of the web content automatically selected by the user interface includes one or more of: a meta-tag, a thumbnail image, a title, and text.

16. The method of claim 15, wherein the portion of the web content automatically selected by the user interface includes a meta-tag, and the submission from the first user includes a modification to the selected meta-tag.

17. The method of claim 7, wherein displaying the portion of the web content within the user interface includes pre-populating one or more fields of a blog entry.

18. The method of claim 1, wherein the submission is stored, by the computing device, in association with the web content.

19. A non-transitory, computer-readable medium storing instructions that, when executed, cause a computing device to:
- receive a submission associated with web content from a first user via a first client computer, wherein the submission includes a portion of the web content;
- receive a request from the first user via the first client computer to provide the submission to a second user of a second client computer;
- in response to the request to provide the submission to the second user, selectively transmit a feed to the second client computer to present the submission to the second user as a real time response to the request; and
- provide a plug-in module to the second client computer, the plug-in module for displaying a user interface separate from a main window of a browser to present the submission to the second user,
- wherein the selectively transmitting is performed in response to determining the second user has activated the plug-in module; and
- wherein the selectively transmitting is not performed in response to determining the second user has not activated the plug-in module,
- wherein in response to the selectively transmitting not being performed, storing the feed and pushing the feed to the plug-in module when the plug-in module is activated.

20. A system comprising:
- a processor; and
- memory in communication with the processor and storing instructions that, when executed by the processor, cause the system to:
  - receive a submission associated with web content from a first user via a first client computer, wherein the submission includes a portion of the web content;
  - receive a request from the first user via the first client computer to provide the submission to a second user of a second client computer;
  - in response to the request to provide the submission to the second user, selectively transmit a feed to the second client computer to present the submission to the second user as a real time response to the request; and
  - provide a plug-in module to the second client computer, the plug-in module for displaying a user interface separate from a main window of a browser to present the submission to the second user,
  - wherein the selectively transmitting is performed in response to determining the second user has activated the plug-in module; and
  - wherein the selectively transmitting is not performed in response to determining the second user has not activated the plug-in module,
  - wherein in response to the selectively transmitting not being performed, storing the feed and pushing the feed to the plug-in module when the plug-in module is activated.

* * * * *